Figure 2:
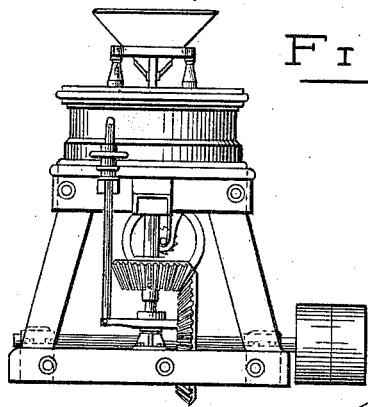

(No Model.) 2 Sheets—Sheet 1.

J. LISTER.
METHOD OF REDUCING ANIMAL FATS.

No. 526,322. Patented Sept. 18, 1894.

WITNESSES:
Chas. W. LaPorte.
M. B. May

INVENTOR:
Joseph Lister
by Doubleday & Bliss
Attys.

(No Model.) 2 Sheets—Sheet 2.

J. LISTER.
METHOD OF REDUCING ANIMAL FATS.

No. 526,322. Patented Sept. 18, 1894.

WITNESSES:
Chas. W. LaPorte
M. B. May

INVENTOR:
Joseph Lister
by Doubleday & Bliss
Attys

UNITED STATES PATENT OFFICE.

JOSEPH LISTER, OF CHICAGO, ILLINOIS.

METHOD OF REDUCING ANIMAL FAT.

SPECIFICATION forming part of Letters Patent No. 526,322, dated September 18, 1894.

Application filed September 5, 1893. Renewed July 3, 1894. Serial No. 516,503. (No specimens.)

*To all whom it may concern:*

Be it known that I, JOSEPH LISTER, a citizen of the United States, residing at Chicago, in the county of Cook and State of Illinois, have invented certain new and useful Improvements in Methods of Reducing Animal Fat, of which the following is a specification, reference being had therein to the accompanying drawings.

This invention relates to improvements in the processes by which a separation is effected between the several ingredients of animal fat and masses containing such fat. There are generally several fatty ingredients proper, such as oleine, margarine and stearine, and in addition to these there is a large percentage of membranous or fibrous materials, both those which as a result of vital action are more or less intimately mixed with the fatty parts, and those which become accidentally mixed with the fatty materials during the gathering of the masses at the slaughter-houses or butchering places. Even the membranous or fibrous materials which, as a result of vital action, are distributed through the masses of fat are distinctly different therefrom, both as concerns their chemical constitution and their mechanical structure. They are generally more or less glutinous in their constitution, and it is not only undesirable to have them present in the oily masses obtained from the fat, but it is desirable to utilize them in the manufacture of other articles, such as glue.

Heretofore in the manufacture of oleomargarine and similar materials, it has been customary to follow one or the other of two or three methods in treating the raw substances received from the butchers or slaughtering houses. In each of these processes, so far as my knowledge goes, it has been necessary to subject the materials to a comparatively high heat and to the action of one or more foreign substances for the purpose of compelling the deposit of the "scrap" or the membranous or fibrous materials referred to. Generally the raw materials are first subjected to the action of hashing knives or mincing machines from which there results a body of fat and membranous substances mingled together, the knives or reducing devices not only breaking up the fat cells but also cutting into small particles the membranes and strings of fiber. Then subsequently the hashed or minced mass is subjected to heat in vats for the purpose of inducing a separation of the "scrap" and the oily parts. After that, the oily parts are then subjected to pressure while being heated to compel the more liquid parts to exude from the stearine; but the presence of the finely cut or reduced particles of membrane or fiber are so largely distributed throughout the whole mass during both the stages of treatment last referred to that a comparatively high heat is necessary in order to liquefy the more oily parts; and it is well known that the higher the heat which is used, the less perfect are the results.

The object of the present invention is to provide a method by which the membranous or fibrous material is prevented from being cut, reduced or disintegrated while the fatty masses are being broken down or crushed. By my process the "scrap" parts are so treated mechanically that they are not disintegrated or cut or torn into small pieces, but remain in such state that the particles or pieces are comparatively large and heavy after the reducing operation is effected. I do not employ the ordinary hashing or mincing knives or even the ordinary rollers or stones, but employ devices so constructed and arranged in relation to each other that the mass which is being passed through them shall be subjected to sufficient pressure to crush the fat cells while at the same time the membranous or fibrous parts shall be rolled and saved from disintegration.

The process may be carried out by either of several mechanisms. I prefer to employ metallic grinding plates having operative faces more or less similar in their general characteristics to millstones, but which have a peculiar "dress" of such nature that the ends above referred to are readily attained.

In order to convey a full understanding of one of the methods of carrying out my invention, I have shown in the drawings a reducing machine which is in some respects constructed and has power applied to it in a way similar to that followed in making grinding mills.

Figure 3:
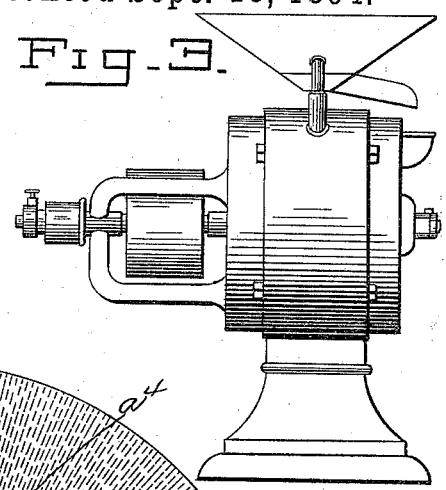
Figure 1:
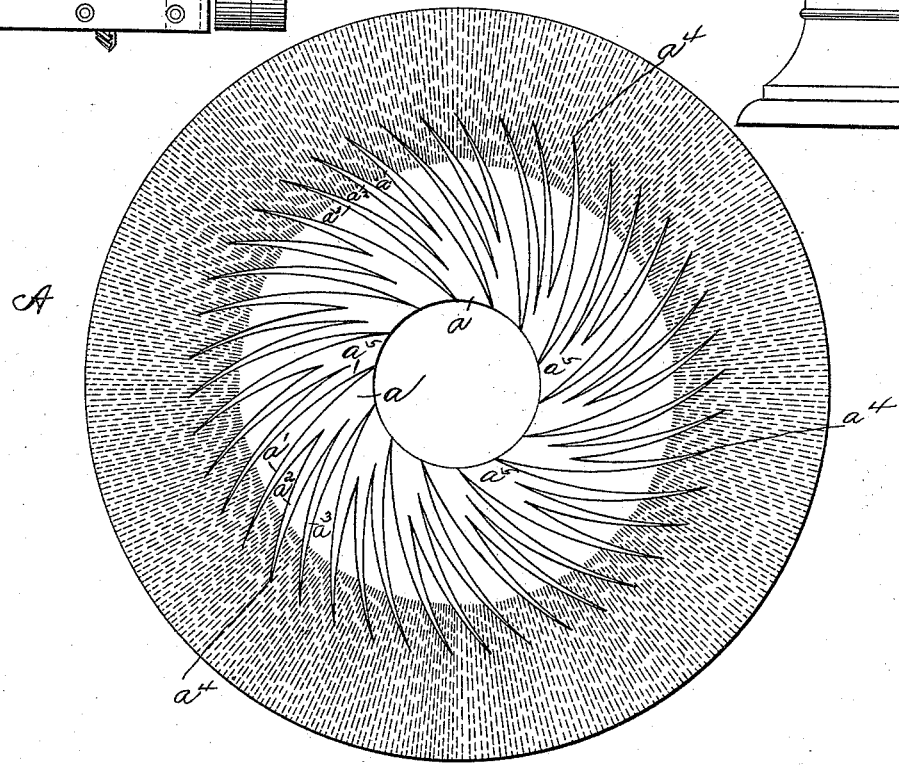
Figures 4, 5:
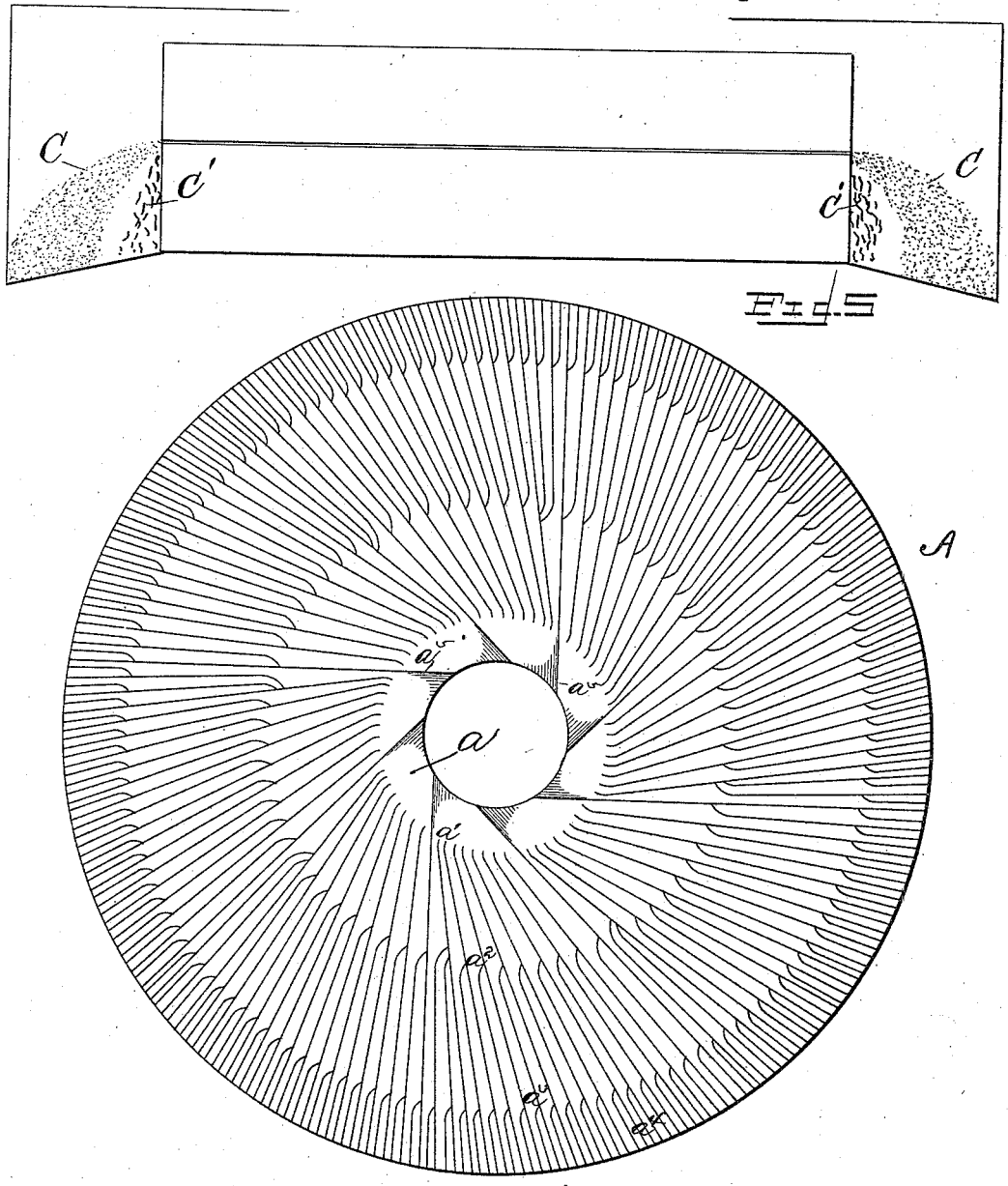

Figure 1 is a face view of one of the grinders. Fig. 2 shows a machine having grinding devices of the sort referred to. Fig. 3 is a substantially similar machine, except that the operative parts rotate on a horizontal axis. Fig. 4 shows a modification of the "dress" on the operative face. Fig. 5 is a conventional diagram illustrating the effects of the apparatus on the different materials.

In the drawings A represents one of the grinding devices. Preferably it is made of cast metal, but I do not wish to be limited to this particular material. Stone of one sort or another can be employed, but I find that a very suitable "dress" can be given to a metallic grinder of the character shown.

$a$ indicates the main or central part of the groove or furrow which divides at some distance from the eye of the grinder into three or more forks, $a'$, $a^2$, $a^3$, each of the latter and the furrow as a whole being preferably tangential to a circle around the eye, and formed either on a straight or a curvilinear axis. The grinding face is divided so as to have the furrows disposed in the way illustrated. The furrows do not extend entirely to the skirt, but fade out into the surface at $a^4$, which surface is stippled, roughened, or finely corrugated, as indicated in the drawings. A grinding device of this sort may be mounted in any suitable way. Two of them are placed opposite to each other in the ordinary way, one being stationary and the other being a "runner." They may be arranged in horizontal planes, and the "runner" being connected with a vertical driving shaft as shown in Fig. 2, or they may be placed on a horizontal axis, and the "runner" may be driven as in Fig. 3. In any case, the grinders should have their operative faces so adjusted that the desired effects above described shall be attained. They are spaced apart sufficiently to allow the fibers or shreds of membranous or "scrap" material to pass outward without being attacked to the same extent that the more truly "fatty" materials are. The cells of the latter are broken down and instantly caused to separate from the fibrous or membranous parts by the centrifugal force,—the "runner" being rotated very rapidly to secure such force. The fibrous parts are readily caught by the tangential ribs as at $a^5$ which act to retard them while the adhering fatty parts are loosened and reduced, these as they disintegrate tending to advance rapidly ahead of the fibers, the latter being rolled outward and gradually becoming more and more cleaned from the fat. As they become thinner they pass over the relatively more elevated parts of the grinding plate, the final cleansing or separating being effected as they roll over the surface at $a^4$ prior to their escape at the "skirt." For some materials the grinding plate is varied as to the lines of the grooves $a$ and the ribs $a^5$, as is shown in Fig. 4, a construction of this sort being applicable when it is necessary to retard the fibers relatively longer in order to thoroughly cleanse or separate them.

Fig. 5 shows, diagrammatically, the action at which I aim, the different results produced on the more fatty materials, on the one hand, and on the fibrous, on the other, being clearly shown at C, C'. The effect of this is to largely assist, during the succeeding stages of the treatment, in securing the separation, mechanically, of the fat from the fibers and membranes; and, thus, to avoid the necessity of the high heat which has been heretofore commonly depended on for such separation.

While I have herein shown some of the devices by which my process of treatment can be carried out, it will be understood that I do not limit myself thereto, as other instrumentalities can be employed for accomplishing substantially the same ends.

I do not herein claim the specific mechanism or apparatus shown in the present case relating to the steps taken to attain the desired results.

I do not herein claim either of the particular forms of apparatus illustrated for carrying out the present process, the claim in this case being limited to the method itself.

What I claim is—

The herein described method of treating fatty materials in the manufacture of oleomargarine, it consisting in mechanically removing the fibers and membranous ingredients in a more or less nearly integral state, by a rolling action while the fatty masses containing them are still in their natural structural condition and at the same time separating the fatty ingredients by a cell-breaking or crushing action, (in contradistinction to subjecting the initial masses to a grinding, crushing, or hashing action) whereby all the ingredients thereof are uniformly comminuted or reduced, substantially as set forth.

In testimony whereof I affix my signature in presence of two witnesses.

JOSEPH LISTER.

Witnesses:
H. H. BLISS,
M. B. MAY.